US012794391B2

(12) United States Patent
Thüringer et al.

(10) Patent No.: US 12,794,391 B2
(45) Date of Patent: Nov. 10, 2026

(54) POWER TOOL, METHOD, ARRANGEMENT, COMPUTER PROGRAM PRODUCT AND COMPUTER READABLE MEDIUM

(71) Applicant: FESTOOL GMBH, Wendlingen (DE)

(72) Inventors: Michael Thüringer, Großbettlingen (DE); Alexander Fürst, Donzdorf (DE); Patrick Schnelle, Ostfildern (DE); Tobias Hofmann, Kirchheim (DE); Michal Calta, Ceská Lípa (CZ)

(73) Assignee: Festool GmbH, Wendlingen (DE)

( * ) Notice: Subject to any disclaimer, the term of this patent is extended or adjusted under 35 U.S.C. 154(b) by 542 days.

(21) Appl. No.: 18/252,326

(22) PCT Filed: Oct. 28, 2021

(86) PCT No.: PCT/EP2021/079922
§ 371 (c)(1),
(2) Date: May 9, 2023

(87) PCT Pub. No.: WO2022/101020
PCT Pub. Date: May 19, 2022

(65) Prior Publication Data

US 2023/0412103 A1 Dec. 21, 2023

(30) Foreign Application Priority Data

Nov. 10, 2020 (DE) ..................... 10 2020 214 108.8

(51) Int. Cl.
*H02P 23/26* (2016.01)
*B25F 5/00* (2006.01)
*H02K 7/14* (2006.01)

(52) U.S. Cl.
CPC ................ *H02P 23/26* (2016.02); *B25F 5/00* (2013.01); *H02K 7/145* (2013.01)

(58) Field of Classification Search
None
See application file for complete search history.

(56) References Cited

U.S. PATENT DOCUMENTS

2014/0028237 A1 1/2014 Park et al.
2014/0203755 A1 7/2014 Becerra et al.
(Continued)

FOREIGN PATENT DOCUMENTS

CN 109995305 7/2019
CN 110620459 12/2019
(Continued)

OTHER PUBLICATIONS

International Search Report issued in International Application No. PCT/EP2021/079922, Feb. 9, 2022, 6 pages w/ translation.
(Continued)

*Primary Examiner* — Bernard Rojas
(74) *Attorney, Agent, or Firm* — HSML P.C.

(57) ABSTRACT

A power tool, in particular a hand-held power tool with a tool, an electric motor for driving the tool and a control unit for controlling the electric motor. The power tool is designed for connection to a mains voltage and includes a rectifier arrangement with an intermediate circuit for providing an intermediate circuit voltage based on the mains voltage, the intermediate circuit voltage having a plurality of successive voltage half-waves, the control unit being configured to provide a torque curve for driving the electric motor, the torque curve including a respective torque half-wave for each voltage half-wave, and the control unit being configured to determine an countervoltage induced in the electric motor and, in response to the countervoltage being greater than or equal to the intermediate circuit voltage, to reduce a current torque value of the torque curve.

16 Claims, 4 Drawing Sheets

(56) References Cited

U.S. PATENT DOCUMENTS

| | | | |
|---|---|---|---|
| 2017/0077846 A1 | 3/2017 | Ishikawa | |
| 2018/0071843 A1* | 3/2018 | Yoshinari | H02K 7/145 |
| 2024/0246217 A1* | 7/2024 | Hofmann | B25F 5/00 |

FOREIGN PATENT DOCUMENTS

| | | |
|---|---|---|
| EP | 0 957 570 | 11/1999 |
| EP | 2 034 605 | 3/2009 |
| EP | 3 278 933 | 2/2018 |
| EP | 3 386 096 | 10/2018 |
| JP | 2003-061382 | 2/2003 |
| WO | 2012/127851 | 9/2012 |

OTHER PUBLICATIONS

Examination Report issued in corresponding German Patent Application No. 10 2020 214 108.8, Nov. 14, 2022, 7 pages.
Office Action issued in corresponding Chinese Patent Application No. 202180089980.5, May 28, 2026, 14 pages w/ translation.

* cited by examiner

POWER TOOL, METHOD, ARRANGEMENT, COMPUTER PROGRAM PRODUCT AND COMPUTER READABLE MEDIUM

The invention relates to a power tool, in particular a hand-held power tool, for example a polishing device, a grinding device and/or a sawing device, with a tool, an electric motor for driving the tool and a control unit for controlling the electric motor. The power tool is designed for connection to a mains voltage and comprises a rectifier arrangement with an intermediate circuit for providing an intermediate circuit voltage based on the mains voltage.

The intermediate circuit is, for example, a capacitor that serves in particular to smooth the rectified line voltage. There are various approaches for dimensioning the intermediate circuit. A first approach is to dimension the intermediate circuit so large that the intermediate circuit voltage is almost constant. In particular, this allows almost constant phase currents for the current flowing to the electric motor and a resulting almost constant torque curve of the electric motor. However, a large intermediate circuit results in a poor power factor and high harmonic components in the pickup current. A second approach is to dimension the intermediate circuit small so that the intermediate circuit voltage follows the mains voltage, especially the rectified mains voltage. However, when the electric motor is driven conventionally, such a small intermediate circuit can result in areas where the induced countervoltage of the electric motor becomes greater than or equal to the intermediate circuit voltage and no current can flow into the motor. This behavior can result in torque ripple at twice the mains frequency. Furthermore, with a small intermediate circuit, the ohmic dissipation in the motor windings may be greater, so that the electric motor must be designed larger.

SUMMARY OF THE INVENTION

One object of the invention is to provide an improved power tool.

The object is solved by a power tool according to the disclosure.

In the power tool, the intermediate circuit voltage has a plurality of successive voltage half-waves. In particular, the intermediate circuit, for example a capacitor, is dimensioned so small that the intermediate circuit voltage follows the rectified mains voltage and the voltage half-waves are formed as a result. In particular, the rectified mains voltage comprises a sequence of positive sine half-waves. Exemplarily, the intermediate circuit voltage follows the rectified mains voltage over at least 50% of the amplitude of the rectified line voltage. For example, the intermediate circuit voltage follows the rectified mains voltage in a range from 140 V to 320 V. Due to the small intermediate circuit, a good power factor is expediently achieved, for example a power factor of at least 0.70 or of at least 0.75.

The control unit is configured to provide a torque curve for controlling the electric motor. The torque curve comprises a respective torque half-wave for each voltage half-wave. The control unit is configured to determine a countervoltage induced in the electric motor and to reduce a current torque value of the torque curve in response to the fact that the countervoltage is greater than or equal to the intermediate circuit voltage. In particular, the control unit reduces the current torque value to such an extent that braking torques and/or torque ripples are reduced or avoided.

Preferably, the control unit closed-loop controls the torque-forming current—i.e. in particular a q-current—to zero when the induced countervoltage of the electric motor is greater than or equal to the intermediate circuit voltage. Expediently, the control unit maintains an electrical connection to the electric motor even when the induced countervoltage of the electric motor is greater than or equal to the intermediate circuit voltage, so that field-weakening current—i.e. in particular a d-current—or torque-forming current—i.e. in particular the q-current—can always flow to the electric motor, so that in particular braking torques are prevented and/or the power factor can be dynamically adapted to the load.

Advantageous further developments are the subject of the subclaims.

The invention further relates to a method for operating a power tool, in particular a hand-held power tool, for example a polishing device, grinding device and/or sawing device, comprising a tool, an electric motor for driving the tool, and a control unit for controlling the electric motor, comprising the steps:

- providing, by means of a rectifier arrangement having an intermediate circuit, an intermediate circuit voltage based on a mains voltage to which the power tool is connected, the intermediate circuit voltage comprising a plurality of successive voltage half-waves,
- providing a torque curve for driving the electric motor, wherein the torque curve comprises a respective torque half-wave for each voltage half-wave,
- determining a countervoltage induced in the electric motor and
- in response to the countervoltage being greater than or equal to the intermediate circuit voltage, reduce a current torque value of the torque curve.

Expediently, the method is carried out with the described power tool and/or is designed in accordance with a described embodiment of the power tool.

The invention further relates to an arrangement comprising an electric motor for driving a tool and a control unit for driving the electric motor. The control unit is configured to provide a torque curve for driving the electric motor, wherein the torque curve comprises a respective torque half-wave for each voltage half-wave of an intermediate circuit voltage, and wherein the control unit is configured to determine a countervoltage induced in the electric motor and to reduce a current torque value of the torque curve in response to the countervoltage being greater than or equal to the intermediate circuit voltage.

The invention further relates to a computer program product comprising instructions that cause the power tool to perform the above process steps.

The invention further relates to a computer-readable medium on which the computer program is stored.

The invention further relates to a method comprising the step of: loading the computer program product onto a power tool.

BRIEF DESCRIPTION OF THE DRAWINGS

Further exemplary details as well as exemplary embodiments are explained below with reference to the figures. Thereby shows FIG. 1 a schematic representation of a power tool designed as a polishing device, FIG. 2 a schematic representation of a power tool designed as a saw, FIG. 3 a schematic representation of the rectifier arrangement, the control unit and the electric motor of the power tool.

DETAILED DESCRIPTION OF THE INVENTION

Figure 1:
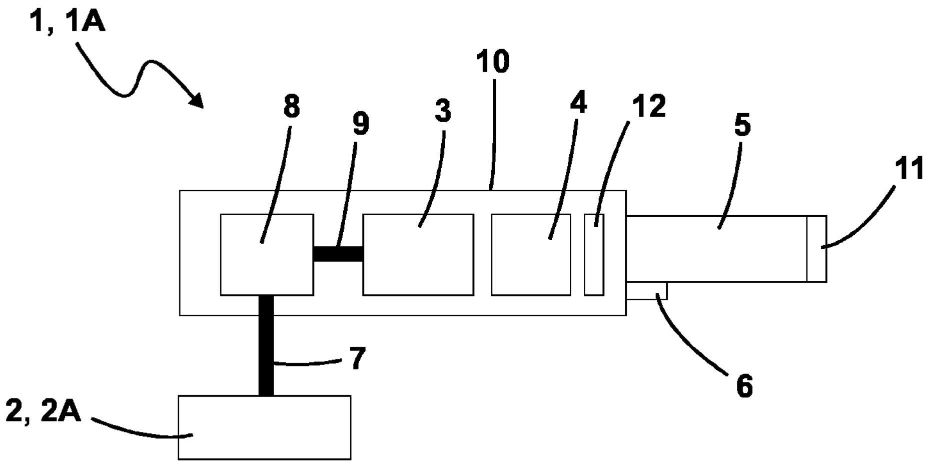
Figure 2:
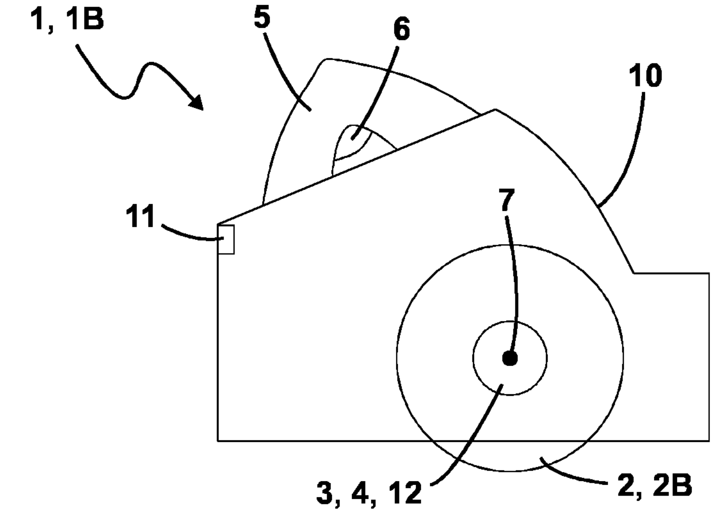

FIGS. 1 and 2 show exemplary embodiments of a power tool 1. Exemplarily, the power tool 1 is designed as a hand-held power tool. The power tool 1 may be manually grasped, carried and/or guided by a user. In particular, the power tool 1 can be designed as a polishing device 1A (see FIG. 1) or as a sawing device 1B (see FIG. 2). The polishing device 1A is, for example, a polishing machine, in particular a rotary polisher. The sawing device 1B is, for example, a plunge-cut saw. Alternatively, the power tool 1 can also be designed as another power tool, for example as a grinder, in particular as a renovation grinder.

The power tool 1 comprises a tool 2. The tool 2 is exemplarily designed as a polishing plate 2A or as a saw blade 2B. Alternatively, the tool 2 can also be embodied as another tool, for example as a grinding plate. In particular, the tool 2 serves to process a workpiece, in particular in a state in which the tool 2 is set into a working motion, in particular into a rotary motion, by an electric motor 3.

The power tool 1 comprises the electric motor 3 for driving the tool 2. In particular, the electric motor 3 is designed to provide the drive rotary motion on the basis of which the tool 2 is driven. The electric motor 3 is designed, for example, as an EC motor—that is, as an electronically commutated motor. The electric motor 3 is in particular a brushless motor, preferably a brushless DC motor, BLDC motor.

The power tool 1 further comprises a control unit 4 for controlling the electric motor 3. The control unit 4 comprises, for example, a microcontroller and/or power electronics. In particular, the control unit 4 is configured to supply the electric motor 3 with a plurality of motor currents I1, I2, I3, which are in particular phase-shifted with respect to one another, in order to expediently cause the electric motor 3 to perform the drive rotary motion. The motor currents I1, I2, I3 may also be referred to as phase currents. The control unit 4 expediently has an inverter for providing the motor currents I1, I2, I3.

Exemplarily, the power tool 1 further comprises a handle 5 with which a user can manually grip, carry and/or guide the power tool 1. The power tool 1 further comprises an operating device 6, for example a button and/or a switch, by means of which the user can control, in particular start and/or stop, the drive of the tool 2. Exemplarily, the operating device 6 is arranged on the handle 5.

The power tool 1 expediently comprises a shaft 7 via which the tool 2 is coupled to the electric motor 3, so that the tool 2 can be driven by the electric motor 3. Optionally, the power tool 1 may comprise a gearbox, in particular an angular gearbox 8, via which the tool 2 is coupled to the electric motor 3. In FIG. 1, the power tool 1 exemplarily comprises a coupling shaft 9 via which the electric motor 3 is coupled to the angular gearbox 8. The angular gearbox 8 is exemplarily coupled to the tool 2 via the shaft 7.

Alternatively, the electric motor 3 can be coupled directly to the tool 2, for example via the shaft 7.

Exemplarily, the power tool 1 comprises an outer housing 10, in which expediently the electric motor 3, the control unit 4 and/or a rectifier arrangement 12 are arranged. Exemplarily, the handle 5 is arranged on the outer housing 10. Alternatively, the handle 5 may be part of the outer housing 10.

The power tool 1 is designed for connection to a mains voltage V1 (see FIG. 2). The mains voltage V1 is an alternating voltage. In particular, the mains voltage V1 is sinusoidal and has an exemplary effective value of 230 V and/or a mains frequency of 50 Hz. Furthermore, the mains voltage V1 may have an effective value of 120 V and/or a mains frequency of 60 Hz. The power tool 1 comprises a connection 11, for example a mains plug and/or a mains plug connection, via which the power tool 1 can be connected to the mains voltage, for example to a socket.

Figure 3:
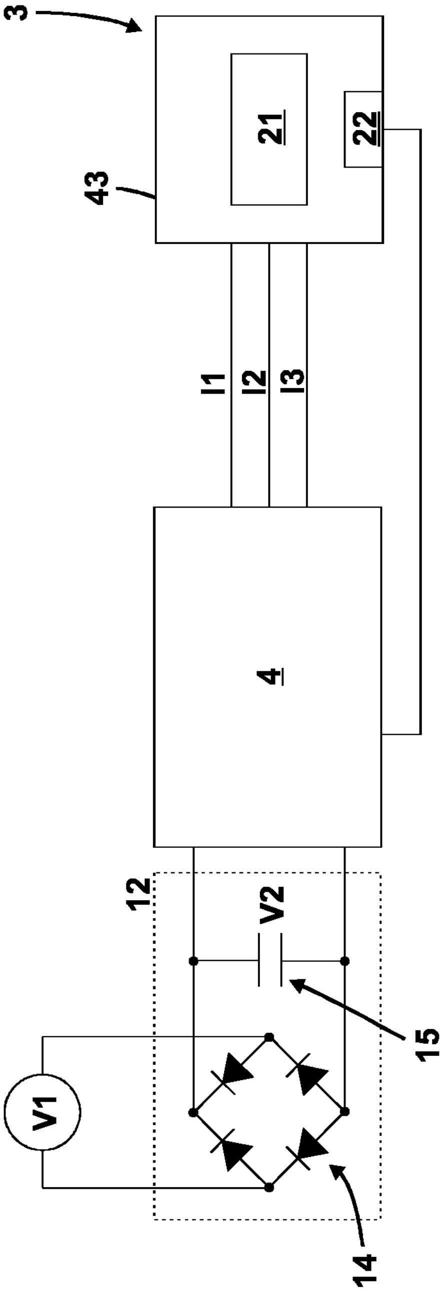

The power tool 1 has the rectifier arrangement 12, which is arranged in the outer housing 10, as an example. The rectifier arrangement 12 is shown, for example, in FIG. 3. The rectifier arrangement 12 is configured to provide an intermediate circuit voltage V2 based on the mains voltage V1. The rectifier arrangement 12 comprises a rectifier 14, which is exemplarily designed as a bridge rectifier. The rectifier 14 expediently comprises four diodes, which are connected as a bridge in an exemplary manner. The mains voltage V1 is supplied to the rectifier 14, which provides a rectified mains voltage based on the mains voltage V1. The rectifier arrangement 12 further comprises an intermediate circuit 15, which is exemplarily designed as a capacitor. The intermediate circuit 15 is connected to the output of the rectifier 14. The intermediate circuit 15 serves to smooth the rectified line voltage. The smoothed rectified mains voltage shall also be referred to as the intermediate circuit voltage V2. The intermediate circuit voltage V2 drops across the intermediate circuit 15, in particular across the capacitor.

The intermediate circuit 15, in particular the capacitor, is for example smaller than 100 μF, smaller than 50 μF, smaller than 30 μF, smaller than 20 μF or smaller than 10 μF.

Figure 4:
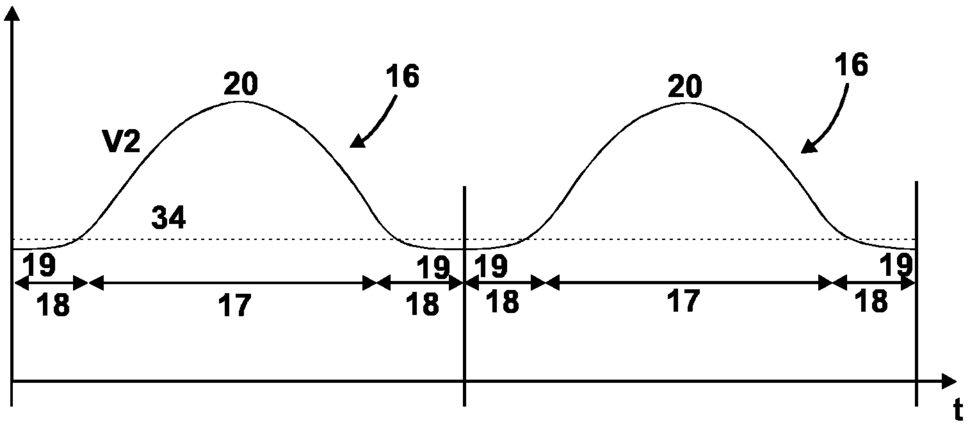
FIG. 4 shows a temporal course of an intermediate circuit voltage, FIG. 5 a temporal course of a torque and FIG. 6 a block diagram of signal processing.

An exemplary time characteristic of the intermediate circuit voltage V2 is shown as a solid line in FIG. 4. The intermediate circuit voltage V2 comprises a plurality of successive voltage half-waves 16. Exemplarily, the voltage half-waves 16 each comprise a sine section 17, which has the waveform of a partial section of a sine half-wave. The sine section 17, in particular the partial section, expediently comprises the maximum 20 of the sine half-wave. Exemplarily, the intermediate circuit voltage V2 follows the rectified line voltage in the sine section 17. Exemplarily, the voltage half-waves 16 further comprise two transition sections 18, respectively, arranged before and after the sine section 17. The transition sections 18 comprise the minima 19 of the intermediate circuit voltage V2. In the transition sections 18, the voltage half-waves 16 exemplarily do not have the form of a sine half-wave. In particular, the intermediate circuit voltage does not drop to zero in the transition sections 18. Exemplarily, the intermediate circuit voltage V2 does not follow the rectified mains voltage in the transition sections 18.

The minima 19 of each voltage half-wave 16 are expediently at least 20%, preferably at least 30%, of the maximum 20. For example, the minima 19 of each voltage half-wave 16 are at least 90 V or at least 100 V. Furthermore, the minima 19 of each voltage half-wave 16 are expediently at most 70%, in particular at most 50%, preferably at most 40% or at most 35%, of the maximum 20. For example, the minima 19 are at most 120 V or 110 V.

The control unit 4 and/or the electric motor 3 are preferably fed from the intermediate circuit 15. The control unit 4 is configured to generate motor currents I1, I2, I3 on the basis of the electrical energy provided by the intermediate circuit 15, in particular on the basis of the intermediate circuit voltage V2, and to supply them to the electric motor 3. Exemplarily, the control unit 4 provides three motor currents I1, I2, I3. For example, the motor currents I1, I2, I3 flow from the intermediate circuit 15.

The electric motor 3 comprises, for example, a stator 43 and a rotor 21. The rotor 21 is coupled to the tool 2. By energizing the electric motor 3 with the motor currents I1, I2, I3, the rotor 21 is set into the drive rotary motion relative to the stator 43.

Optionally, the electric motor 3 has a position sensor device 22 which is used to detect the position and/or movement, in particular the current angle, of the rotor 21. The position sensor device 22 comprises, for example, a magnetic sensor, in particular a Hall sensor. Expediently, the control unit 4 is configured to detect the current angle of the rotor 21 with the aid of the position sensor device 22. The control unit 4 can also be designed to detect the current rotational speed of the electric motor 3 using the position sensor device 22.

Alternatively or additionally, the control unit 4 can be designed to detect the current angle of the rotor 21 and/or the current rotational speed of the electric motor 3 without sensors. In this case, no position sensor device 22 is expediently present. The control unit 4 is in particular configured to determine, in particular to measure, a countervoltage 34 induced in the electric motor and to calculate the current angle of the rotor 21 and/or the current rotational speed of the electric motor 3 on the basis of the countervoltage 34. In particular, the control unit 4 is designed to calculate the current angle of the rotor 21 and/or the current speed of the electric motor 3 using the back EMF principle, where "EMF" stands for "Electromotive Force".

Figure 6:
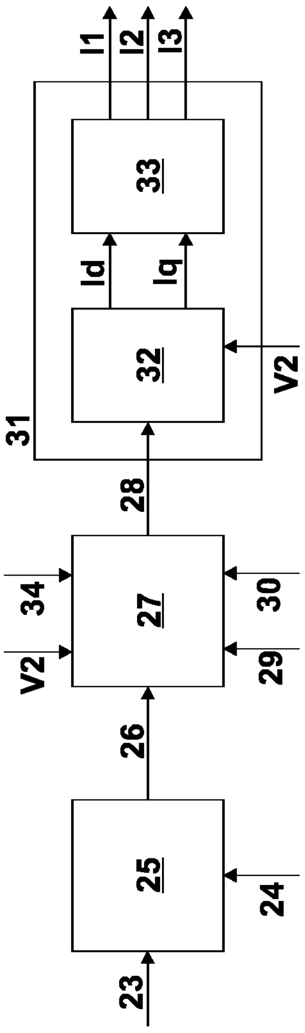

FIG. 6 shows an exemplary block diagram of the signal processing performed by the control unit 4 for driving the electric motor 3.

The control unit 4 is expediently designed to perform a closed-loop rotational speed control of the electric motor 3. In particular, the control unit 4 is designed to provide the motor currents I1, I2, I3 on the basis of a setpoint rotational speed 23 and an actual rotational speed 24. The setpoint rotational speed 23 is set by the control unit 4, for example, according to a user input made with the operating device 6. Alternatively or additionally, the setpoint rotational speed 23 may be stored in advance in the control unit 4 and/or calculated by the control unit 4. The actual rotational speed 24 is the current rotational speed of the electric motor 3 and is expediently obtained as described above—in particular by means of the position sensor device 22 and/or on the basis of a sensorless principle, in particular on the basis of the induced countervoltage 34. The actual rotational speed 24 describes how fast the rotor 21 rotates relative to the stator 43.

The control unit 4 comprises a closed-loop rotational speed controller 25 to which the setpoint rotational speed 23 and the actual rotational speed 24 are fed. On the basis of the setpoint rotational speed 23 and the actual rotational speed 24, in particular on the basis of a comparison between the setpoint rotational speed 23 and the actual rotational speed 24, the closed-loop rotational speed controller 25 calculates a torque setpoint 26. The torque setpoint 26 specifies the torque to be applied to the rotor 21 by energizing the electric motor 3 in order to achieve a change in the actual rotational speed value towards the rotational speed setpoint.

The control unit 4 further comprises a torque curve calculation unit 27, which is configured to calculate a torque curve 28 over time based on the torque setpoint 26. The torque curve 28 may also be referred to as a torque signal. An exemplary torque curve 28 is shown as a solid line in FIG. 5. Exemplarily, the torque curve 28 has a trapezoidal curve shape.

The control unit 4 further comprises a motor current provision unit 31, which is designed to calculate the motor currents I1, I2, I3 on the basis of the torque curve 28. Exemplarily, the motor current provision unit 31 comprises a setpoint current specification unit 32, which is adapted to calculate a q-current iq, in particular a q-current setpoint, and a d-current id, in particular a d-current setpoint, in particular based on the torque curve 28. The d-current and the q-current are currents in a rotor-related d/q system, which rotates according to the rotation of the rotor 21. The d-current represents the flux-forming component and the q-current represents the torque-forming component. The d current may be referred to as the d-component or the field-weakening current, and the q-current may be referred to as the q-component or the torque-forming current. The setpoint current specification unit 32 calculates the q-current, in particular the q-current setpoint, and the d-current, in particular the d-current setpoint such that when the electric motor 3 is energized according to the q-current, in particular the q-current setpoint, and the d-current, in particular the d-current setpoint, the torque curve 28 is obtained. By way of example, the temporal course of the calculated q-current, in particular the q-current setpoint, corresponds to the torque curve 28. In particular, the q-current, in particular the q-current setpoint, has the same curve shape as the torque curve 28.

The motor current provision unit 31 expediently comprises a closed-loop current controller 33 which is designed to provide the motor currents I1, I2, I3. In particular, the closed-loop current controller 33 is designed to perform a closed-loop current control of the motor currents I1, I2, I3. The motor currents I1, I2 and 13 are preferably pulse width modulated. The closed-loop current controller 33 provides the motor currents I1, I2, I3 based on the q-current and the d-current, in particular by performing a transformation from a two-axis coordinate system to a three-axis coordinate system. The closed-loop current controller 33 provides the motor currents I1, I2, I3 such that the calculated q-current and the calculated d-current are obtained. The motor currents I1, I2, I3 are used to energize the electric motor 3, in particular motor windings of the stator 43. Exemplarily, the rotor 21 has a permanent magnet and is set into the driving rotary motion by an interaction of the permanent magnet with the magnetic field generated by the energization of the motor windings.

The closed-loop current controller 33 preferably performs a closed-loop control of the q-current, in particular of a q-current actual value, to the q-current setpoint and/or a closed-loop control of the d-current, in particular of a d-current actual value, to the d-current setpoint. Exemplarily, the motor current provision unit 31 calculates the q-current actual value and/or the d-current actual value based on the motor currents I1, I2, I3.

Figure 5:
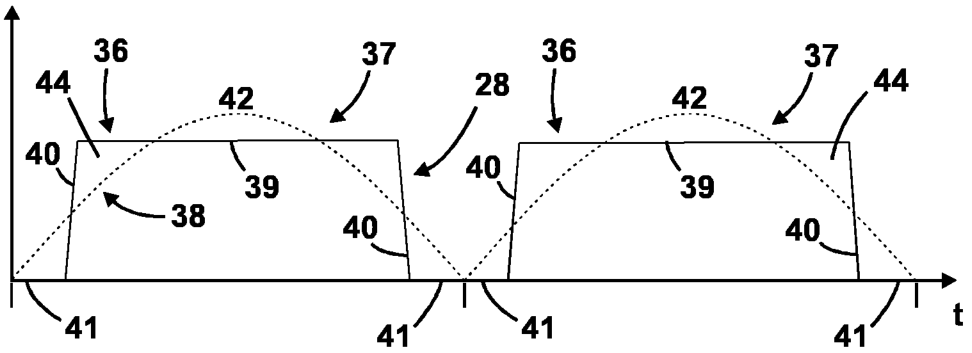

The torque curve 28 will be discussed in more detail below. FIG. 5 shows an exemplary torque curve 28 (as a solid line). The torque curve 28 has a plurality of successive torque half-waves 36.

The torque curve 28 is provided, in particular calculated, by the control unit 4 for the control of the electric motor. The control unit 4 is configured to provide, in particular to calculate, a respective torque half-wave 36 for each voltage half-wave 16. Each voltage half-wave 16 is expediently assigned a respective torque half-wave 36, which in particular has the same period and/or the same phase angle as the voltage half-wave 16.

Preferably, the control unit 4 is designed to determine a countervoltage 34 induced in the electric motor 3 and, in response to the fact that the countervoltage 34 is greater than or equal to the intermediate circuit voltage V2, to reduce a current torque value of the torque curve 28, in particular to set it to zero, exemplarily by means of the torque curve calculation unit 27. In particular, the control unit 4 is adapted to perform a comparison between the intermediate circuit voltage V2 and the countervoltage 34 and, based on the result of the comparison, to set the current torque value of the torque curve 28 to zero (when the countervoltage 34 is greater than or equal to the intermediate circuit voltage). If the comparison between the intermediate circuit voltage V2 and the countervoltage 34 indicates that the countervoltage 34 is less than the intermediate circuit voltage, the control unit 4 expediently does not set the current torque value of the torque curve 28 to zero.

FIG. 4 shows an exemplary characteristic of the countervoltage 34. The countervoltage 34 is shown as a dashed line and is exemplarily constant over the two voltage half-waves 16 shown in FIG. 4. At the beginning and at the end of each voltage half-wave 16—i.e. at the minima 19—the intermediate circuit voltage V2 drops below the countervoltage 34. FIG. 5 shows the associated torque curve 28, which is set to zero at the times when the intermediate circuit voltage V2 is lower than the countervoltage 34.

This results in a torque curve 28 comprising a plurality of successive pulses 44. Each torque half-wave 36 has a respective pulse 44. During each pulse 44, the torque curve 28 is continuously greater than zero. In an exemplary embodiment, the pulses 44 are each trapezoidal in shape. Alternatively, the pulses may each be rectangular in shape. Between two pulses 44, the torque curve 28 is equal to 0. The torque curve 28 is equal to zero before and after each pulse 44. The sections of the torque curve 28 where the torque curve 28 is zero shall also be called zero sections or torque minima 41. The pulses 44 occur at the time sections where the intermediate circuit voltage V2 is greater than the countervoltage 34. The torque minima 41 occur at the time intervals at which the intermediate circuit voltage V2 is less than the countervoltage 34.

Preferably, the control unit 4 is configured to determine, in particular to calculate, the induced countervoltage 34 on the basis of the rotational speed of the electric motor 3. The rotational speed of the electric motor 3 is measured in particular as explained above by means of the position sensor device 22. Furthermore, the control unit 4 may be configured to measure the countervoltage 34.

Preferably, the control unit 4 is configured to calculate a q-current setpoint according to the current torque value and to closed-loop control a q-current, in particular a q-current actual value, for the control of the electric motor 3 to the q-current setpoint. In particular, the control unit 4 is configured to set the q-current setpoint to zero and to closed-loop control the q-current, in particular the q-current actual value, to zero in response to the countervoltage 34 being greater than or equal to the intermediate circuit voltage V2. Exemplarily, the setpoint current specification unit 32 sets the q-current setpoint to zero in response to the current torque value of the torque curve 28 being equal to zero. Expediently, the current controller 33 closed-loop controls the q-current actual value to zero when the countervoltage 34 is greater than or equal to the intermediate circuit voltage V2.

Furthermore, the control unit 4 is preferably configured, in response to the countervoltage 34 being greater than or equal to the intermediate circuit voltage V2, to preferably reduce the d-current, in particular the d-current setpoint, in particular to set it to zero, preferably to closed-loop control it to zero.

Preferably, when the countervoltage 34 is greater than or equal to the intermediate circuit voltage V2, the control unit 4 is adapted to maintain an electrical connection leading to the electric motor 3, which electrical connection serves to control the electric motor 3. In particular, in response to the countervoltage 34 being greater than or equal to the intermediate circuit voltage V2, the power tool 1 does not continuously interrupt this connection. In particular, the control unit 4 is configured to continue the closed-loop control of the torque-forming current and not to cut it off when the induced countervoltage 34 of the electric motor 3 is greater than or equal to the intermediate circuit voltage V2.

The control unit 4 is configured to provide, in particular to calculate, a respective torque half-wave 36 for driving the electric motor 3 for each voltage half-wave 16. Preferably, the waveform of the respective torque half-wave is flattened compared to the waveform of the (respectively associated) voltage half-wave 16. The flattened waveform results in particular in a lower ohmic power loss when the electric motor 3 is energized, expediently with the same average torque.

The control unit 4 expediently supplies current to the electric motor 3 in proportion to the torque half-wave. When the torque half-wave 36 assumes larger values, the control unit 4 increases the current supplied to the electric motor 3. The ohmic power loss is a function of the square of the current supplied to the electric motor 3, so that larger currents result in a disproportionate ohmic power loss. The flattened waveform of the torque half-waves 36 reduces the current maxima that are particularly significant for ohmic power loss (due to the quadratic dependence), so that ohmic power loss can be reduced, especially with little or no reduction in torque. The flattened waveform can also be referred to as a homogenized waveform. In particular, each torque half-wave 36 has a more uniform waveform than the respective voltage half-wave 16 and/or a respective (imaginary) sine half-wave 37 of the same period and/or the same area. Preferably, the standard deviation of the respective torque half-wave 36 is smaller than the standard deviation of the respective voltage half-wave 16 and/or a respective (imaginary) sine half-wave 37 of the same period and/or the same area.

In particular, the flattened waveform is one that has, for the same area under the waveform, a lower maximum, especially relative to an (imaginary) sine half-wave 37. FIG. 5 shows a reference waveform 38 (as a dashed line) that has the waveform of a rectified sine wave and includes successive sine half-waves 37. The sine half-waves 37 each have the same period as the torque half-waves 36, and the area under each sine half-wave 37—i.e., the integral over the period of the sine half-wave 37—is expediently equal to the area under a respective torque half-wave 36—i.e., equal to the integral over the period of a torque half-wave 36. The maximum of each torque half-wave 36 is expediently smaller, in particular at least 10% smaller or at least 20% smaller, than the maximum of the respective sine half-wave 37. The sine half-wave 37 serves at this point to mathematically define the flattened waveform of the torque half-wave and need not be provided by the power tool 1. The flattened waveform of each torque half-wave 36 is preferably mathematically defined to have, for the same period and the same area as a (particularly imaginary) sine half-wave 37, a smaller maximum than the sine half-wave 37.

For example, in the flattened waveform, the ratio between the maximum of the waveform and the average value of the waveform is reduced. Expediently, the ratio between the maximum of the torque half wave 36 and the average value of the torque half wave 36 is smaller than the ratio between the maximum 20 of the voltage half wave 16 and the average value of the voltage half wave 16.

The explanation of a torque half-wave 36 preferably applies to each torque half-wave 36. Preferably, the control unit 4 is configured to provide the torque half-wave 36 with a trapezoidal waveform or a rectangular waveform. Exemplarily, the torque half-waves 36 each have a trapezoidal waveform. Alternatively, the torque half-waves may have a different waveform, such as a rectangular waveform.

The torque half-wave 37 further expediently has two torque minima 41, which represent the beginning and end of the torque half-wave 36. Exemplarily, the torque is zero at the torque minima 41. In particular, the torque minima 41 are those time intervals in which the induced countervoltage 34 is greater than or equal to the (associated) voltage half-wave 16.

As shown in FIG. 4, the induced countervoltage 34 is exemplarily constant over the voltage half-wave 16. The minima 19, in particular the transition sections 18, of the voltage half-wave 16 are exemplarily below the induced countervoltage 34. The maximum 20, in particular the sine section 17, is exemplarily above the induced countervoltage 34.

The torque half-wave 36 has a plateau section 39 that comprises or represents the maximum of the torque half-wave 36. The plateau section 39 preferably has a slope of 0 and extends in particular over at least 40%, at least 50%, at least 60%, at least 70% or at least 80% of the period of the torque half-wave 36. Exemplarily, the maximum 42 of the sine half-wave 37 is higher than the plateau section 39. The torque half-wave 36 further has two flank sections 40 surrounding the plateau section 39. The flank sections 40 have (in absolute value) a higher slope than the plateau section 39, in particular a higher slope than the sine half-wave 37 and/or the voltage half-wave 16. According to a possible embodiment, the flank sections 40 may be perpendicular—that is, in particular, have a slope of (in absolute value) infinity. Each pulse 44 is formed by a plateau section 39 and two flank sections 40. A torque half-wave 36 thus comprises the following sections which follow one another in time, in particular directly one after the other, in the following order: a first torque minimum 41 (preferably equal to zero), a first flank section 40 (preferably with a positive slope), the plateau section 39 (preferably with a slope of zero), a second flank section 40 (preferably with a negative slope) and a second torque minimum (preferably equal to zero). The torque minima 41 together extend in time, in particular, over at least 10%, at least 20% or at least 30% of the period of the torque half-wave 36.

The control unit 4 is expediently configured to provide each torque half-wave 36 with a period equal to the period of a respective voltage half-wave 16. Preferably, the frequency of the torque curve 28 is twice the frequency of the mains voltage V1. In particular, the frequency of the torque curve 28 is 100 Hz or 120 Hz.

For example, the control unit 4 detects the period of the voltage half-waves 16 and/or the time interval of adjacent zero crossings of the mains voltage V1 and takes the detected period and/or the time interval as the period for the torque half-waves 36. Expediently, the control unit 4 synchronizes the torque half-waves 36 with the mains voltage V1 and/or the voltage half-waves 16. For example, the control unit 4 synchronizes the minima of the torque curve 28 with the zero crossings of the mains voltage V1 so that the minima of the torque curve 28 occur at the same time as the zero crossings of the mains voltage V2. Furthermore, the control unit 4 can synchronize the minima of the torque curve 28 with the minima 19 of the intermediate circuit voltage V2, so that the minima of the torque curve 28 occur at the same time as the minima of the intermediate circuit voltage V2. For example, the control unit 4 is configured to determine a phase angle 30 of the mains voltage V1 and/or of the intermediate circuit voltage V2 and to provide the torque half-wave 36 in accordance with the phase angle 30, in particular in such a way that the torque half-wave 36 is synchronous with the voltage half-wave 16 and/or with the mains voltage V1. The torque curve 28 expediently has the same phase angle as the intermediate circuit voltage V2.

The control unit 4, in particular the torque curve calculation unit 27, is preferably configured to calculate the torque curve 28 on the basis of a waveform profile 29. The waveform profile is expediently stored in advance in the control unit 4 and/or is provided by the control unit 4. The waveform profile 29 defines the flattened waveform of the torque half-wave 36. For example, the waveform profile 29 defines a trapezoidal waveform or a rectangular waveform.

The control unit 4 is exemplarily configured to calculate the torque curve 28 taking into account the phase angle 30. In particular, the control unit 4 is configured to calculate the period for a respective torque half-wave 36 on the basis of the phase angle 30 and to stretch or compress the waveform profile 29 in time according to the calculated period so that the period of the waveform profile 29 is equal to the calculated period.

Expediently, the control unit 4 is further configured to calculate the respective torque half-wave 36 based on the torque setpoint 26. In particular, the control unit 4 is configured to calculate the respective torque half-wave 36 such that the average value of the torque half-wave 36 is equal to the torque setpoint 26. In particular, the control unit 4 is configured to calculate the respective torque half-wave 36 by scaling the waveform profile 29 according to the torque setpoint 26. Exemplarily, the control unit 4 is configured to scale the waveform profile 29 with the torque setpoint 26 or a scaling factor dependent on the torque setpoint 26.

As mentioned above, the control unit 4 has a closed-loop rotational speed controller 25 for providing the torque setpoint 26, on the basis of which the control unit 4 provides the respective torque half-wave 36. In particular, the control unit 4 is configured to energize the electric motor 3 in accordance with the torque half-wave.

The provision of the torque half-wave 36 may also be referred to as torque shaping. Torque shaping and the accompanying current shaping, in particular in the form of a trapezoid or a rectangle, can reduce the ohmic power loss—i.e. the copper losses—so that the electric motor 3 can be made smaller.

As already explained above, a small intermediate circuit 15 is expediently used so that the intermediate circuit voltage V2 mainly corresponds to the (rectified) mains voltage. By using a small intermediate circuit, installation space and costs can expediently be saved. In order to reduce copper losses—i.e. the ohmic power loss—in the electric motor 3, the torque and thus the current flowing through the electric motor 3, in particular the q-current, is expediently closed-loop controlled to a trapezoid or rectangle which preferably has twice the mains frequency.

Since the copper losses are calculated via $I^2*R$, the plateau section 39 of the trapezoidal torque half-wave 36 should have as small a torque value as possible. This is preferably achieved by selecting as large as possible the time per half-wave in which current can flow into the electric motor 3, i.e. by selecting the plateau section 39 to have a large temporal extent. The electric motor 3 is expediently designed for a lower voltage than the mains voltage V1. Furthermore, the induced countervoltage of the electric motor 3 is expediently changed by varying the field-weakening current as a function of the intermediate circuit voltage V2.

Preferably, the control unit 4, in particular the setpoint current specification unit 32, is configured to calculate the d-current, in particular the d-current setpoint, taking into account the intermediate circuit voltage V2. In particular, the control unit 4 is configured to set the d-current, in particular the d-current setpoint, in accordance with the intermediate circuit voltage V2. For example, the control unit 4 is configured to reduce the d-current, in particular the d-current setpoint, in absolute value when the intermediate circuit voltage V2 is higher and to increase it in absolute value when the intermediate circuit voltage V2 is lower. In particular, the control unit 4 is configured to set the d-current, in particular the d-current setpoint, on the basis of the intermediate circuit voltage V2 such that the induced countervoltage is reduced, in particular below the intermediate circuit voltage V2. The setting of the d-current, in particular the d-current setpoint, is, for example, inversely proportional to the intermediate circuit voltage V2. When the intermediate circuit voltage V2 increases, the d-current, in particular the d-current setpoint, is reduced in absolute value, and when the intermediate circuit voltage V2 decreases, the d-current, in particular the d-current setpoint, is increased in absolute value.

In particular, the control unit 4 is configured to always energize the electric motor, according to the d-current and/or the q-current, so that braking torques are prevented and, in particular, so that the power factor is dynamically adapted to the load.

In particular, the control unit 4 is configured to perform a variation of d-current and q-current as a function of the intermediate circuit voltage V2 and/or mains voltage V1 in order to always optimally control the motor to require as little current as possible.

In particular, the power tool 1 may be operated according to the method explained below. The method comprises the steps:

- providing, by means of the rectifier arrangement 12 with the intermediate circuit 15, the intermediate circuit voltage V2 based on the mains voltage V1 to which the power tool 1 is connected, the intermediate circuit voltage V2 having a plurality of successive voltage half-waves 16,
- providing the torque curve (28) for driving the electric motor (3), wherein the torque curve (28) comprises a respective torque half-wave (36) for each voltage half-wave (16),
- determining the countervoltage (34) induced in the electric motor (3) and
- in response to the countervoltage (34) being greater than or equal to the intermediate circuit voltage (V2), reducing the current torque value of the torque curve (28).

Expediently, the method comprises a further step in which the electric motor 3 is energized in accordance with the torque half-waves so that the rotor 21 is set in the driving rotary motion and thereby the tool 2 is set in the working motion.

Expediently, the method comprises a further step in which a workpiece is processed, in particular polished, ground or sawn, with the tool 2.

The invention claimed is:

1. A power tool with a tool, an electric motor for driving the tool and a control unit for controlling the electric motor, wherein the power tool is designed to be connected to a mains voltage and comprises a rectifier arrangement with an intermediate circuit for providing an intermediate circuit voltage on the basis of the mains voltage, wherein the intermediate circuit voltage has a plurality of successive voltage half-waves, the control unit being configured to provide a torque curve for driving the electric motor, the torque curve comprising a respective torque half-wave for each voltage half-wave, and the control unit being configured to determine a countervoltage induced in the electric motor and, in response to the countervoltage being greater than or equal to the intermediate circuit voltage, to reduce a current torque value of the torque curve, wherein the control unit is configured to calculate a q-current setpoint according to the current torque value and to closed-loop control a q-current for the control of the electric motor to the q-current setpoint.

2. The power tool according to claim 1, wherein the control unit, in response to the countervoltage being greater than or equal to the intermediate circuit voltage, is adapted to set the current torque value of the torque curve to zero.

3. The power tool according to claim 1, wherein the control unit is adapted, in response to the countervoltage being greater than or equal to the intermediate circuit voltage, to set a q-current setpoint to zero and to closed-loop control a q-current to zero.

4. The power tool according to claim 1, wherein the control unit is configured, when the countervoltage is greater than or equal to the intermediate circuit voltage, to maintain an electrical connection leading to the electric motor, which electrical connection serves to drive the electric motor.

5. The power tool according to claim 1, wherein the control unit is configured to determine the induced countervoltage on the basis of a rotational speed of the electric motor.

6. The power tool according to claim 1, wherein the control unit is configured to provide for each voltage half-wave a respective torque half-wave for the control of the electric motor, the waveform of which torque half-wave has, for the same area as a sine half-wave, a lower maximum than the sine half-wave.

7. The power tool according to claim 6, wherein the control unit is configured to provide the torque half-wave with a trapezoidal waveform or a rectangular waveform.

8. The power tool according to claim 1, wherein the control unit is configured to determine a phase angle of the mains voltage and/or of the intermediate circuit voltage and to provide the torque half-wave according to the phase angle.

9. The power tool according to claim 1, wherein the control unit has a closed-loop rotational speed controller for providing a torque setpoint on the basis of which the control unit provides the respective torque half-wave.

10. The power tool according to claim 1, wherein the control unit is configured to energize the electric motor in accordance with the torque half-wave.

11. The power tool according to claim 1, wherein the control unit is configured to calculate a d-current and a q-current for driving the electric motor and to set the d-current in accordance with the intermediate circuit voltage.

12. The power tool according to claim 11, wherein the control unit is configured to reduce the d-current in absolute value when the intermediate circuit voltage is higher and to increase it in absolute value when the intermediate circuit voltage is lower.

13. A method for operating a power tool with a tool, an electric motor for driving the tool and a control unit for controlling the electric motor, the method comprising the steps:

providing, by means of a rectifier arrangement having an intermediate circuit, an intermediate circuit voltage based on a mains voltage to which the power tool is connected, the intermediate circuit voltage comprising a plurality of successive voltage half-waves, providing a torque curve for driving the electric motor, wherein the torque curve comprises a respective torque half-wave for each voltage half-wave, wherein the waveform of each torque half-wave has, for the same area as a sine half-wave, a lower maximum than the sine half-wave, determining a countervoltage induced in the electric motor, and in response to the countervoltage being greater than or equal to the intermediate circuit voltage, reducing a current torque value of the torque curve.

14. An arrangement comprising an electric motor for driving a tool and a control unit for controlling the electric motor, wherein the control unit is configured to provide a torque curve for driving the electric motor, wherein the torque curve comprises a respective torque half-wave for each voltage half-wave of an intermediate circuit voltage and wherein the control unit is configured to determine a countervoltage induced in the electric motor and to reduce a current torque value of the torque curve in response to the countervoltage being greater than or equal to the intermediate circuit voltage, wherein the control unit has a closed-loop rotational speed controller for providing a torque setpoint on the basis of which the control unit provides the respective torque half-wave.

15. A computer-readable medium on which is stored a computer program product comprising instructions, which when executed by a processor, is configured to cause a power tool to perform steps of the method of claim 13.

16. The power tool according to claim 1, wherein the power tool is a hand-held power tool.

* * * * *